(12) United States Patent
Porterfield

(10) Patent No.: US 10,697,585 B1
(45) Date of Patent: Jun. 30, 2020

(54) FLUID DISPENSING APPARATUS FOR DISPENSING OIL OR GREASE

(71) Applicant: Richard Porterfield, Ringling, OK (US)

(72) Inventor: Richard Porterfield, Ringling, OK (US)

(*) Notice: Subject to any disclaimer, the term of this patent is extended or adjusted under 35 U.S.C. 154(b) by 0 days.

(21) Appl. No.: 16/261,721

(22) Filed: Jan. 30, 2019

(51) Int. Cl.
*F16N 3/12* (2006.01)
*F16N 3/08* (2006.01)
*F16N 5/00* (2006.01)

(52) U.S. Cl.
CPC ............... *F16N 3/12* (2013.01); *F16N 3/08* (2013.01); *F16N 5/00* (2013.01)

(58) Field of Classification Search
CPC .............. F16N 3/12; F16N 3/08; F16N 5/00
USPC ........................................................ 222/262
See application file for complete search history.

(56) References Cited

U.S. PATENT DOCUMENTS

| 318,829 | A | | 5/1885 | Taylor | |
|---|---|---|---|---|---|
| 2,007,113 | A | * | 7/1935 | Staples | F16N 5/00 222/56 |
| 2,545,319 | A | * | 3/1951 | Sundholm | F16N 5/00 222/256 |
| 2,555,532 | A | * | 6/1951 | Chinchole | F16N 5/00 222/135 |
| 2,613,855 | A | * | 10/1952 | Pansegrau | F16N 5/00 222/340 |
| 2,767,885 | A | * | 10/1956 | Miller | F16N 5/00 222/175 |
| 2,805,797 | A | * | 9/1957 | Neuman | F16N 5/00 222/253 |
| 2,810,496 | A | * | 10/1957 | Gray | F16N 5/00 222/254 |
| 4,483,375 | A | * | 11/1984 | Martin | F16N 37/02 141/259 |
| 5,067,591 | A | * | 11/1991 | Fehlig | F16N 5/02 141/21 |
| 5,474,214 | A | | 12/1995 | Chung et al. | |
| 7,469,803 | B2 | | 12/2008 | Weems et al. | |

\* cited by examiner

*Primary Examiner* — Jeremy Carroll
(74) *Attorney, Agent, or Firm* — Sanchelima & Associates, P.A.; Christian Sanchelima; Jesus Sanchelima

(57) ABSTRACT

A fluid dispensing apparatus for dispensing oil or grease is disclosed. The fluid dispensing apparatus comprises a base frame and a container coupled to the base frame via an elongated rod. The container stores oil or grease. The fluid dispensing apparatus comprises a plate provided within the container. The plate is coupled to the elongated rod. The fluid dispensing apparatus comprises a first hose coupled to the container. Further, the fluid dispensing apparatus comprises a second hose and a third hose coupled to the first hose via a diverter valve. The third hose is coupled to a gun member. The gun member comprises a dispensing pipe. A user places one leg on the base frame and holds the handle with one hand and the gun member with another. The user presses the container such that the plate pushes the oil into the first hose, and the oil is made to flow into the gun member. The user directs the dispensing pipe to dispense the oil.

9 Claims, 2 Drawing Sheets

FLUID DISPENSING APPARATUS FOR DISPENSING OIL OR GREASE

BACKGROUND OF THE INVENTION

1. Field of the Invention

The present disclosure generally relates to an apparatus for dispensing fluids. More particularly, the present disclosure relates to a fluid dispensing apparatus used with agricultural equipment, the fluid dispensing apparatus comprising a grease gun for dispensing oil/grease.

2. Description of the Related Art

It is known that grease guns are used for dispensing fluids such as grease, oil, lubricants and so on. The grease guns may include, but not limited to, manual powered grease guns, pneumatic grease guns, and battery powered grease guns.

Typically, the manual powered grease guns are operated with one hand, which is used to pump, and other hand is used to direct a hose onto the area that is to be greased. The battery-powered grease guns do not require pumping. Instead a trigger is pressed, while holding the grease gun with one hand, and the hose is directed with the other hand onto the area that is to be greased.

There are several grease guns that were disclosed in the past. An example of a pneumatically controlled air grease gun is disclosed in a U.S. Pat. No. 5,474,214. In U.S. Pat. No. 5,474,214A, an air grease gun including a grip, a barrel, a spout pipe unit and a grease storage tube is disclosed.

Another example is disclosed in a United States patent application 20120318829. In US20120318829A1, a pump apparatus for use with a liquid container for transferring liquid from a liquid container is disclosed. The pump apparatus comprises a pump means comprising a manually operable pump for pumping liquid and formed with a pump chamber through which the pump can pump liquid. It also has an inlet opening for receiving liquid into the pump chamber and an outlet opening for dispensing liquid out of the pump chamber when liquid is pumped through the chamber using the pump. There is a coupling means for mounting the pump means to the opening of a liquid container to permit the gravitational flow of liquid into the pump chamber through the inlet opening when the mounted pump means is placed on ground level and the pump pumped.

Yet another example is disclosed in a U.S. Pat. No. 7,469,803. In U.S. Pat. No. 7,469,803B2, a portable grease gun with the capability of being attached to either a grease-containing barrel or a hose carrying grease from a grease supply container is disclosed. An adapter may be mounted to the barrel mounting in place of a barrel to couple the grease gun to a hose connected to a grease supply container remote from the grease gun. The grease gun includes an output valve, which restrains passage of grease at pressure below 30 psi.

Although the above disclosures allow greasing the machinery and variety of equipment, they have few problems. For instance, while trying to grease areas that are hard to reach or require difficult balancing, it is often difficult to properly apply grease using the grease gun. This difficulty arises because the user must use both his/her hands to operate the grease gun, which leaves no hands for stabilizing the individual.

Other documents describing the closest subject matter provide for a number of more or less complicated features that fail to solve the problem in an efficient and economical way. None of these patents suggest the novel features of the present invention. Specifically, none of the disclosures in the art disclose a fluid dispensing apparatus used with agricultural equipment, the fluid dispensing apparatus comprising a container with a spring-loaded biased bottom plate and a foot base or a base frame.

Therefore, there is a need in the art for a fluid dispensing apparatus comprising a container with a spring-loaded biased bottom plate and a base frame, which a user can use with ease.

SUMMARY OF THE INVENTION

It is one of the main objects of the present invention to provide a fluid dispensing apparatus for dispensing oil or grease and that avoids the drawbacks of the prior art.

It is one object of the present invention to provide a fluid dispensing apparatus for dispensing oil or grease, which a user can operate with ease.

It is one object of the present invention to provide a fluid dispensing apparatus for dispensing oil or grease. The fluid dispensing apparatus comprises a base frame and a container coupled to the base frame via an elongated rod. The container stores oil or grease. The fluid dispensing apparatus comprises a plate provided within the container. The plate is coupled to the elongated rod. The fluid dispensing apparatus comprises a first hose coupled to the container. Further, the fluid dispensing apparatus comprises a second hose and a third hose coupled to the first hose via a diverter valve. The second hose is coupled to a housing having a spring member. The third hose is coupled to a gun member. The gun member comprises a dispensing pipe. A user places one leg on the base frame, and holds the handle with one hand and the gun member with another. The user presses the container such that the plate pushes the oil into the first hose, and the oil is made to flow into the gun member. The user directs the dispensing pipe to dispense the oil.

It is another object of the present invention to provide valves at the second hose and the third hose to control the flow of oil or grease.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art and is not intended to limit the invention to the explicit disclosure, as one or ordinary skill in the art will understand that variations can be substituted that are within the scope of the invention as described.

The present disclosure discloses a fluid dispensing apparatus for dispensing oil or grease. The fluid dispensing apparatus comprises a base frame and a container coupled to the base frame via an elongated rod. The container is used store oil or grease. The fluid dispensing apparatus comprises a plate provided within the container. The plate is coupled to the elongated rod. The fluid dispensing apparatus comprises a first hose coupled to the container. Further, the fluid dispensing apparatus comprises a second hose and a third hose coupled to the first hose via a diverter valve. The second hose is coupled to a housing having a spring member. The third hose is coupled to a gun member. The gun member comprises a dispensing pipe. A user places one leg on the base frame, and holds the handle with one hand and the gun member with another. The user presses the container such that the plate pushes the oil into the first hose, and the oil is made to flow into the gun member. The user directs the dispensing pipe to dispense the oil.

Figure 1:
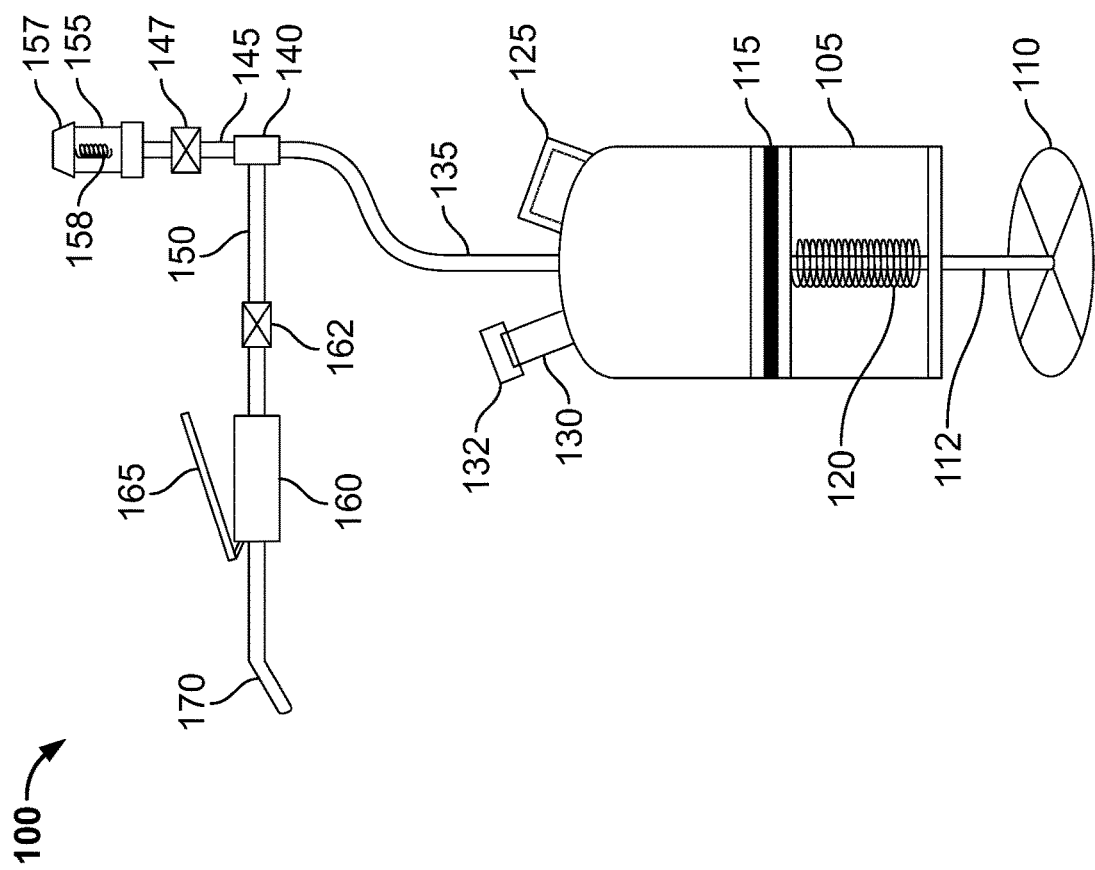
FIG. 1 illustrates a schematic diagram of a fluid dispensing apparatus 100, in accordance with one embodiment of the present disclosure.
Figure 2:
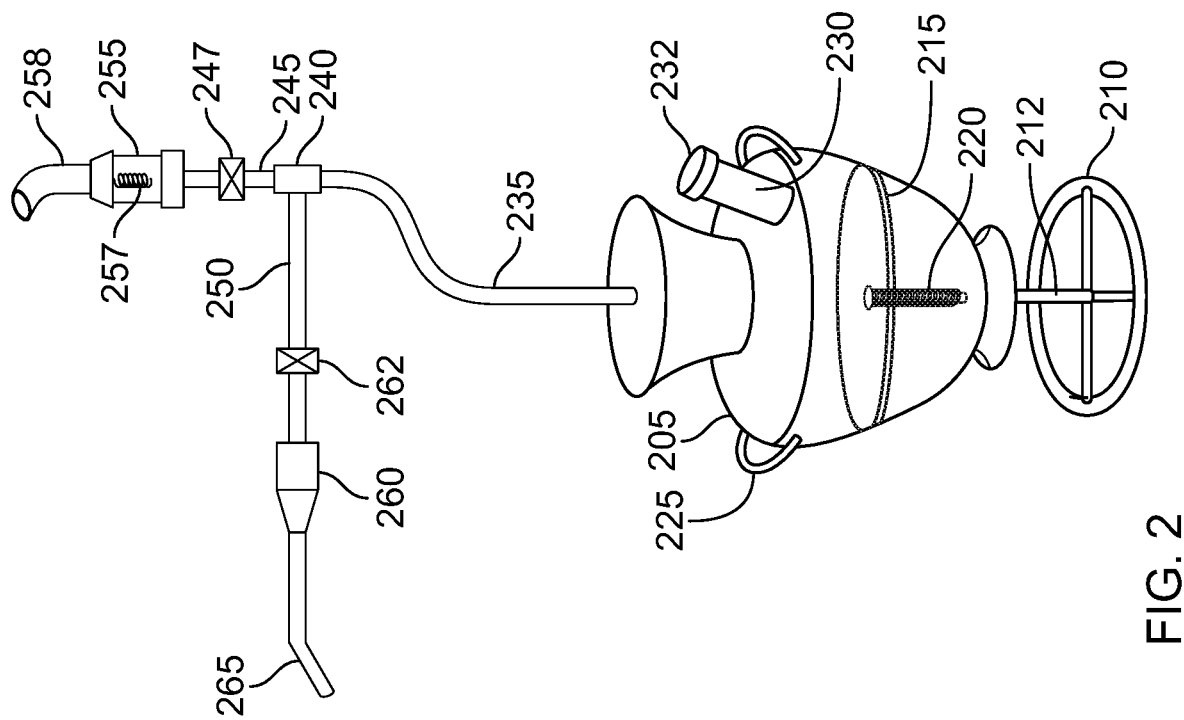
FIG. 2 illustrates a schematic diagram of a fluid dispensing apparatus 200, in accordance with one embodiment of the present disclosure.

Various features and embodiments of a fluid dispensing apparatus for dispensing oil or grease are explained in conjunction with the description of FIGS. 1-2.

Referring to FIG. 1, a schematic diagram of a fluid dispensing apparatus 100 is shown, in accordance with one embodiment of the present disclosure. The fluid dispensing apparatus 100 comprises a container 105. The container 105 may be provided in a cylindrical, square or rectangular shape. The container 105 may be made up of suitable material such as metal, plastic and so on. The container 105 is coupled to a base frame 110 via an elongated rod 112. The base frame 110 may be provided in a circular, square or rectangular shape. It should be understood that the base frame 110 provides support for the container 110 with the help of the elongated rod 112. The base frame 110 may be placed on a ground or any other surface. The elongated rod 112 is preferably made up of metal. However, the elongated rod 112 may also be made with other materials that are known in the art.

The container 105 comprises a plate or O-ring 115 inside the container 105. The container 105 further comprises a first spring member 120 placed underneath the plate 115. It should be understood that the plate 115 is coupled to the elongated rod 112, and the first spring member 120 is placed underneath the plate 115. In other words, the elongated rod 112 is extended until the O-ring or the plate 115 placed inside the container 105 such that the plate 115 is moved up and down inside the container 105 with the help of the first spring member 120.

The container 105 comprises a handle 125 at the top. The handle 125 may be used to hold or lift the container 105. Further, the container 105 comprises a canister 130. The canister 130 may be used to fill oil or grease in the container 105. In one implementation, the canister 130 may be provided with a cap 13 to close the canister 130. In one example, the canister 130 may comprise a first valve (not shown). The first valve may be used to control the intake of the oil or grease into the container 105.

Further, the fluid dispensing apparatus 100 comprises a first hose 135 coupled to the container 105 at the top. It should be understood that one end of the first hose 135 is coupled to the container 105 and the other end is coupled to a diverter valve 140. The length of the first hose 135 may be selected based on the need. The fluid dispensing apparatus 100 further comprises a second hose 145 and a third hose 150 coupled to the diverter valve 140. It should be understood that the length of the second hose 145 and the third hose 150 are shown for illustrative purpose and should not be construed in limited sense.

In one implementation, the second hose 145 is coupled to a housing 155 via a second valve 147. Further, the housing 155 comprises a cover or a cap 157. Further the housing 157 comprises a second spring member 158 coupled to the cover 157. In one implementation, the housing 155 comprises a ball (not shown) coupled to the second spring member 158.

The third hose 150 is coupled to a gun member 160 via a third valve 162. The gun member 160 comprises a lever 165 and a discharge pipe 170. The discharge pipe 170 may indicate a spiket, which comprises an opening (not shown) at the end to discharge fluid such as oil or grease.

In order to operate the fluid dispensing apparatus 100, a user may keep one leg on the base frame 110. Further, the user may use one hand to hold the handle 125 of the container 105 and other hand to hold the gun member 160. In order to pump the oil or grease from the container 105 to the gun member 160, the user may press the container 105 with the help of the handle 125. When the container 105 is pressed, the container 105 is pushed down. Due to the presence of the first spring member 120 on the elongated rod 112, the O-ring or the plate 115 pushes up the oil or grease in the container 105 and as a result, the oil or grease enters the first hose 135. Subsequently, the oil enters the second hose 145 and the third hose 150. It should be understood that the second valve 147 and the third valve 162 may be used to control the flow of the oil or grease in the second hose 145 and the third hose 150, respectively.

As specified above, the oil or grease is made to enter the second hose 145 and the third hose 150. When the oil or grease reaches the gun member 160, the user may use the lever 165 to dispense the oil or grease through the discharge pipe 170.

It should be understood that the housing 155 comprising the second spring member 158 and the ball is used to stop leakage of the oil or grease from the second hose 145.

The fluid dispensing apparatus 100 may be used to apply oil or grease on agricultural equipment. For example, the fluid dispensing apparatus 100 may be used to apply oil or grease at seal bearings. In order to apply the oil or grease to the seal bearings, the user may place the container 105 on the ground. Further, the user may place one hand on the handle 125 and use another hand to hold the gun member 160 and position or direct the discharge pipe 170 to the seal bearings. Subsequently, the user may press the container 105 to pump the oil stored in the container 105 into the first hose 135. Subsequently, the oil or grease enters the third hose 150 and the user operates the lever 165 to dispense the oil or grease onto the seal bearings. The user may repeatedly press down the container 105 to pump oil continuously based on the description provided above.

Now, referring to FIG. 2, a schematic diagram of a fluid dispensing apparatus 200 is shown, in accordance with another embodiment of the present disclosure. The fluid dispensing apparatus 200 comprises a container 205. In the current embodiment, the container 205 is provided in a shape of a vase such that the container 205 is appealing to the user and easy to carry around from one place to another. The container 205 is coupled to a base frame 210 via an elongated rod 212. The container 205 comprises a plate or O-ring 215 inside the container 205. The container 205 further comprises a spring member 220 placed underneath the plate 215. In one implementation, the elongated rod 210 is extended until the O-ring 215 placed inside the container 205.

The container 205 comprises a plurality of handles 225 to hold the container 205. Further, the container 205 comprises a canister 230 with a cap 232. The canister 130 may comprises a first valve (not shown).

Further, the fluid dispensing apparatus 200 comprises a first hose 135 coupled to the container 205 at the top. It should be understood that one end of the first hose 235 is coupled to the container 205 and the other end is coupled to a diverter valve 240. The fluid dispensing apparatus 200 further comprises a second hose 245 and a third hose 250 coupled to the diverter valve 240. In one implementation, the second hose 245 is coupled to a housing 255 via a second valve 247. Further, the housing 255 comprises a second spring member 257. Further, the housing 255 comprises a pipe 258 bent at an angle of up to 45 degrees.

The third hose 250 is coupled to a gun member 260 via a third valve 262. The gun member 260 comprises a dispensing pipe 265 used for dispensing oil or grease from the container 205.

The operation of the fluid dispensing apparatus 200 is similar to the operation of the fluid dispensing apparatus 100.

Based on the above, it is evident that fluid dispensing apparatus may be used to dispense oil or grease at the equipment parts such as seal bearings, etc. The user may operate the fluid dispensing apparatus by holding the container with one hand and gun member with other easily.

The container may be selected in various shapes. Further, the hoses may be selected having varied length so that the dispensing pipe can be pointed easily at the area where the oil or grease needs to be dispensed. As such, the farm equipment can be maintained easily, and life of parts can be prolonged.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A fluid dispensing apparatus, comprising:
    a base frame;
    a container coupled to the base frame via an elongated rod, wherein the container stores oil or grease;
    a plate provided within the container, wherein the plate is coupled to the elongated rod;
    a first hose coupled to the container;
    a second hose and a third hose coupled to the first hose via a diverter valve;
    a housing coupled to the second hose; and
    a gun member coupled to the third hose, wherein the gun member comprises a dispensing pipe, wherein a user places one leg on the base frame, wherein the user holds the handle with one hand and gun member with another, wherein the user presses the container such that the plate pushes the oil into the first hose, wherein the oil is made to flow into the gun member, and wherein the user directs the dispensing pipe to dispense the oil.

2. The fluid dispensing apparatus of claim 1, wherein the container comprises a canister at the top.

3. The fluid dispensing apparatus of claim 2, wherein the canister comprises a cap.

4. The fluid dispensing apparatus of claim 1, wherein the elongated rod comprises a spring member inside the container.

5. The fluid dispensing apparatus of claim 1, wherein the second hose comprises a valve.

6. The fluid dispensing apparatus of claim 1, wherein the third hose comprises a valve.

7. The fluid dispensing apparatus of claim 1, wherein the gun member comprises a lever to dispense oil through the dispensing pipe.

8. The fluid dispensing apparatus of claim 1, wherein the housing comprises a spring member and a ball to prevent leakage of the oil.

9. A fluid dispensing apparatus, comprising:
    a base frame;
    a container coupled to the base frame via an elongated rod, wherein the container stores oil or grease, wherein the elongated rod comprises a spring member inside the container;
    a plate provided within the container, wherein the plate is coupled to the elongated rod;
    a first hose coupled to the container;
    a second hose and a third hose coupled to the first hose via a diverter valve;
    a housing coupled to the second hose; and
    a gun member coupled to the third hose, wherein the gun member comprises a dispensing pipe, and wherein the gun member comprises a lever to dispense oil through the dispensing pipe, wherein a user places one leg on the base frame, wherein the user holds the handle with one hand and gun member with another, wherein the user presses the container such that the plate pushes the oil into the first hose, wherein the oil is made to flow into the gun member, and wherein the user directs the dispensing pipe to dispense the oil.

* * * * *